Oct. 6, 1925.
P. A. MEEHAN
TUNNEL KILN CAR CONSTRUCTION
Filed Feb. 7, 1924
1,556,294
2 Sheets-Sheet 1
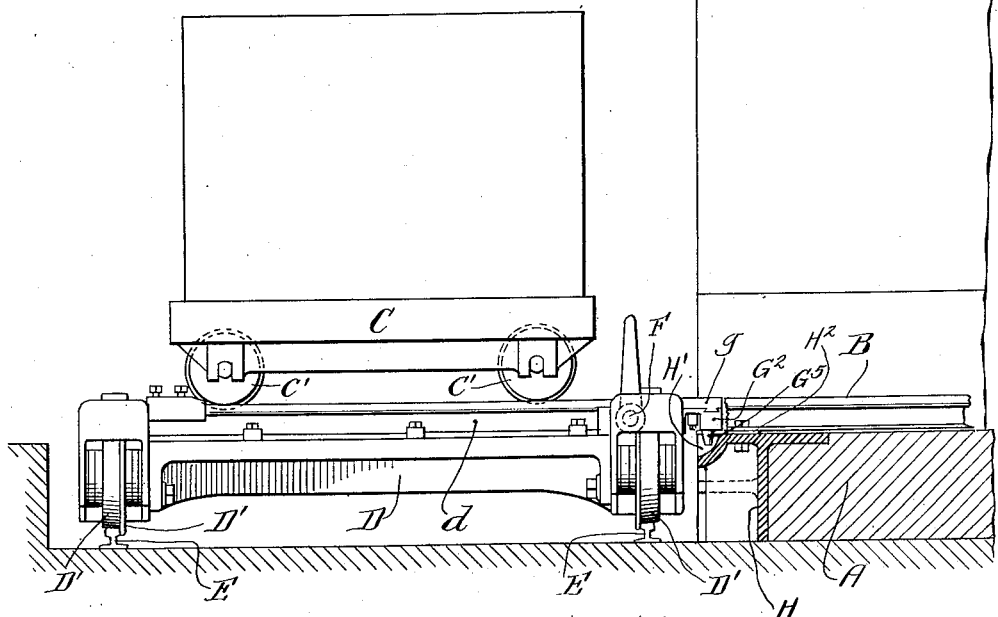
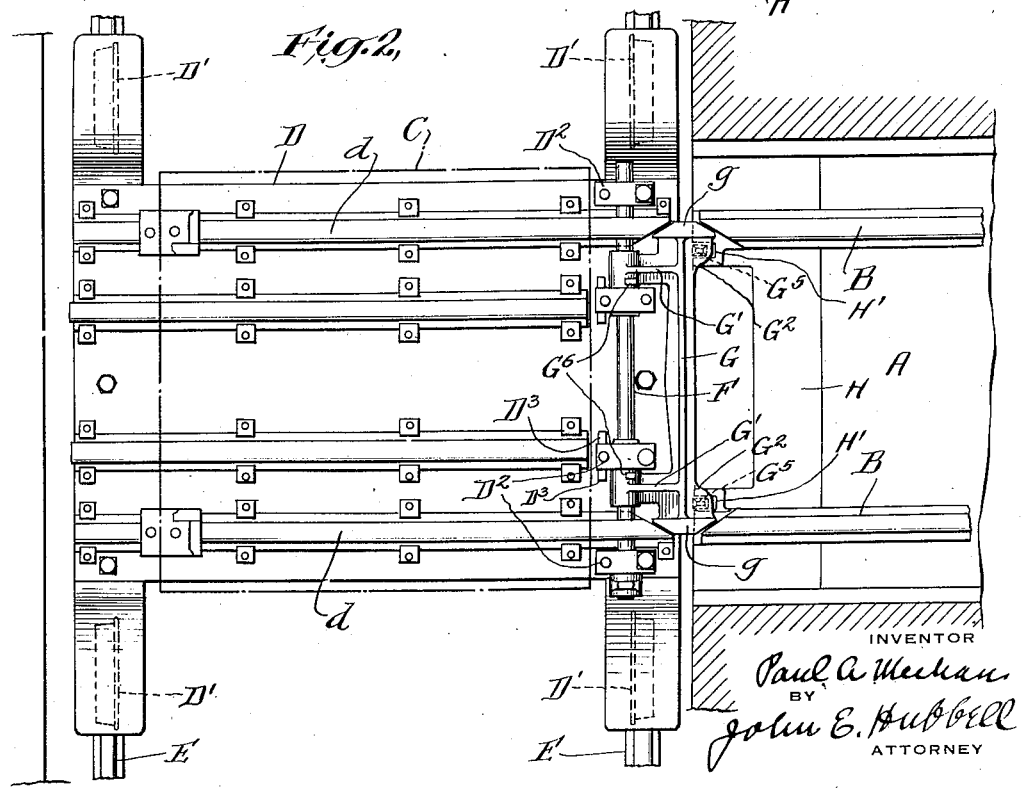
INVENTOR
Paul A. Meehan
BY
John E. Hubbell
ATTORNEY

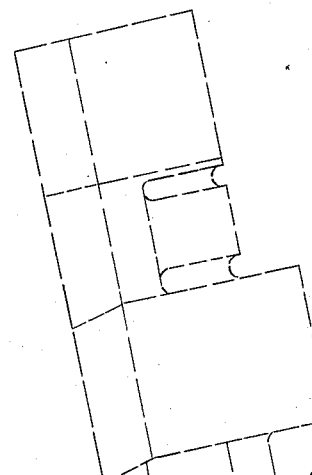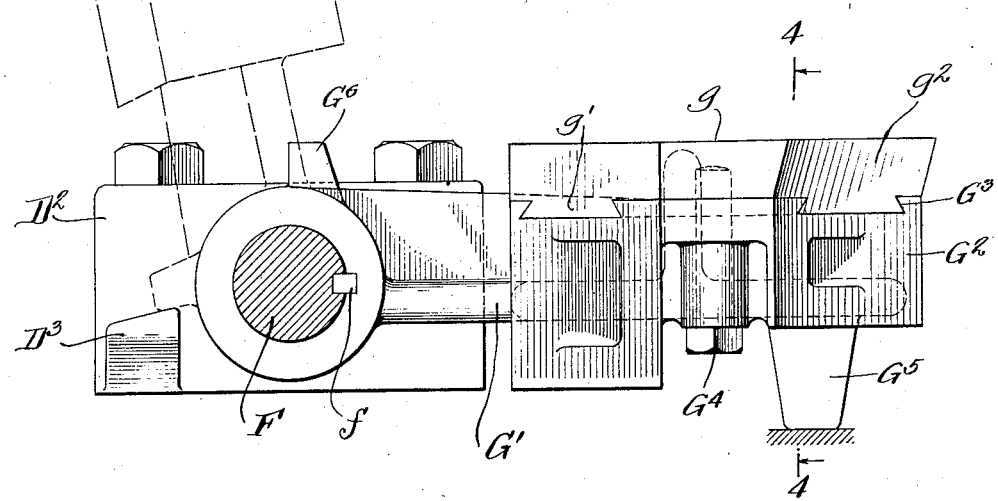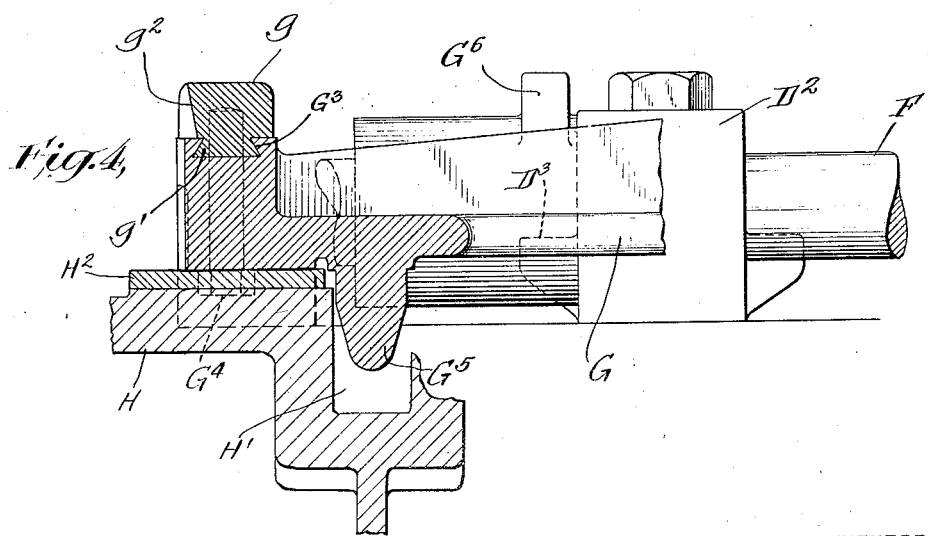

Patented Oct. 6, 1925.

1,556,294

UNITED STATES PATENT OFFICE.

PAUL A. MEEHAN, OF CLEVELAND, OHIO, ASSIGNOR TO AMERICAN DRESSLER TUNNEL KILNS, INC., OF CLEVELAND, OHIO, A CORPORATION OF NEW YORK.

TUNNEL-KILN-CAR CONSTRUCTION.

Application filed February 7, 1924. Serial No. 691,190.

*To all whom it may concern:*

Be it known that I, PAUL A. MEEHAN, a citizen of the United States, and resident of Cleveland, in the county of Cuyahoga and State of Ohio, have invented certain new and useful Improvements in Tunnel-Kiln-Car Construction, of which the following is a specification.

The general object of my present invention is to provide improved means for transferring a car from one to another of two track sections, movable relatively to one another in a direction transverse to the direction in which the track sections run. The invention was primarily devised for use in connection with a transfer car by means of which a tunnel kiln car is transferred from the track rails running through a tunnel kiln to another set of track rails laterally displaced from the tunnel kiln track rails. Mounted on the transfer car are track rails adapted to be brought into alignment with the tunnel kiln track rails or with the other track rails over which the tunnel kiln car is moved onto or off the transfer car by movements of the latter along a track transverse to the tunnel kiln track rails.

Heretofore, in the operation of such a transfer car, difficulty has been experienced in effecting a smooth and easy movement of the tunnel kiln car onto or off the transfer car. This difficulty has been due in part to the difficulty of always bringing the transfer car into the position in which the track rails which it carries are in exact alignment with the tunnel kiln or other track rails over which the tunnel kiln car moves onto or off the transfer car, and in part to open joints between the track rails on the transfer car and the aligned rails provided to insure sufficient mechanical clearance between the transfer car and the stationary structure on which the said aligned rails are mounted. In accordance with the present invention, this above mentioned difficulty is avoided by forming the track on the transfer car in two sections, one of which is rigidly secured to the car and is long enough to support a tunnel kiln car. The other section is mounted on the transfer car to move back and forth between one position in which it forms aligned extensions of the track rails of the first mentioned section, with joints between the two sections, and between the movable section and the aligned stationary track rails, which are close fitting and preferably are inclined to the rail axes, and a second position in which the movable section is out of alignment with the other track rails and does not interfere with the movement of the transfer car. Advantageously, this movable track section is so mounted on the transfer car and so shaped with respect to the stationary track structure, that it will insure accurate alignment between the stationary track rails and those on the transfer car, and will form a means for moving the transfer car to secure this alignment if some small movement of the transfer car is necessary for the purpose. The use of the invention practically eliminates the jolting of tunnel kiln cars in moving them onto and off the transfer car which has heretofore given trouble, particularly when the cars are loaded with relatively delicate ceramic wares liable to be broken by such jolting.

The various features of novelty which characterize my invention are pointed out with particularity in the claims annexed to and forming a part of this specification. For a better understanding of the invention, however, its advantages and specific objects attained with it, reference should be had to the accompanying drawings and descriptive matter in which I have illustrated and described a preferred embodiment of the invention.

Of the drawings:

Fig. 1 is an elevation partly in section of a portion of a tunnel kiln;

Fig. 2 is a plan view partly in section of the apparatus shown in Fig. 1;

Fig. 3 is an end elevation of the track rail connecting hinge member; and

Fig. 4 is a partial section on the line 4—4 of Fig. 3.

In the drawings I have illustrated my invention in connection with a transfer car D at one end of a tunnel kiln A of conventional type. The kiln A is provided with longitudinally extending track rails B on the kiln chamber floor, along which tunnel kiln cars C are pushed through the kiln chamber one after another in any usual or suitable manner. The transfer car D has wheels D', running on track rails E which extend at right angles to the length of the tunnel kilns A, and are shown as located on the floor of a pit as is usual, so that the tunnel kiln car supporting rails *d* mounted on the top of the metallic superstructure or body of the car D, are at the same level as the tops of the rails B. The transfer car D is movable along the rails E from a position in which the two rails *d* are in alignment with the two tunnel kiln track rails B, into a second position in which the rails *d* are in register with other track rails (not shown) parallel to the rails B and which may constitute the usual return track for the kiln cars or may be the rails leading from a drying kiln or loading or unloading station (not shown).

Mounted on the upper side of the body of the car D are bearings $D^2$ for a rock shaft F. The latter forms the hinge pintle or pivot shaft for the movable track section member G, which may well be made of cast steel. As shown, the member G comprises a relatively heavy and rigid body portion having arms G' formed with passages for the shaft F, on which the arms are rigidly secured as by keys. At each end the body portion of the member G has an enlarged head portion $G^2$, formed with a seat for corresponding connecting track rail section *g*. As shown, each head $G^2$ is formed with an undercut slot $G^3$ receiving an undercut tenon *g'* formed on the end side of the corresponding section *g*, each track section *g* being rigidly secured in its seat by a stud bolt $G^4$. In one position of the member G, the track rails *g* form aligned extensions of the rails bringing the gap otherwise existing between the rails *d* and B. The ends of the track rails *d* are bevelled oppositely with respect to one another, and each with respect to the corresponding rail B, and when the ends of the track rail section *g* are moved into alignment with the rails B and *d*, the upper surfaces of the rails B, *g* and *d* present practically smooth and continuous surfaces for the travel of the kiln car wheels C' as the kiln car is moved off the transfer car into the kiln or from the kiln onto the transfer car. The fact that the joints between the different rails sections are inclined to the lengths of the rail sections contributes to the smoothness of the track surface.

Advantageously, the overlapping surfaces of the rail sections B and *g* are relatively shaped so that when the rail sections *g* are swung down into alignment with the rails B they will cam the transfer car into the position in which the rails *d* are in exact alignment with the rails B if the transfer car had not previously been positioned with exact accuracy. As shown, this result is accomplished by slightly undercutting the overlapping surfaces $g^2$ of the rail section *g* as shown in Fig. 4. The hinge member G is supported with the track rails *g* in alignment with the rails *d* and B by engagement of the portion of the member G projecting beyond the side of the car with the supporting structure for the rails B or other rails over which the car C is to be moved onto or off the transfer car. As shown, the ends of the rails B are supported by a metallic structure H incorporated in the kiln foundation through shims $H^2$ which can be replaced by shims of different thickness to compensate for rail wear or other causes for variation in the level of the top of the surfaces of the rails. The metallic structure is formed with recesses H' for centering and locking lugs $G^5$ on the member G. To permit movement of the transfer car along the rails E, the rock shaft F is rotated as by means of the handle F' to swing the rail sections *g* into the position shown in dotted lines in Fig. 3, and advantageously, as shown, the hinge member G is provided with lugs $G^6$, which then bear against the stops $D^3$ on the transfer car body.

It will be understood of course that the hinged track connecting section mounted on the transfer car will serve to properly connect the transfer car rails *d* not only with the track rails B, but with the return track rails or other track rails alongside the tunnel kiln A over which the tunnel kiln cars C are moved onto or off the transfer car.

While, in accordance with the provisions of the statutes, I have illustrated and described the best form of my invention now known to me, it will be apparent to those skilled in the art that changes may be made in the form of the apparatus discosed without departing from the spirit of my invention as set forth in the appended claims, and that certain features of my invention may be used to advantage without a corresponding use of other features.

Having now described my invention, what I claim as new and desire to secure by Letters Patent is:

1. A transfer car provided with a track over which a car may be moved onto and off the transfer car, said track being formed in sections, one of which is hinge connected to the transfer car to turn with respect thereto about an axis transverse to the direction of car movement over said track.

2. A transfer car provided with a track over which a car may be moved onto and off the transfer car, said track being formed in two sections, one of which is stationary on the transfer car while the other is hinge connected to the transfer car, each section comprising track rails with bevelled ends providing rail tread portions which overlap when the hinged section is moved to bring its rails into alignment with the rails of the other section.

3. A transfer car provided with a track over which a car can be moved onto and off the transfer car and formed in sections, one of which comprises a frame hinge connected to the transfer car and track rail parts detachably connected to said frame.

4. A transfer car provided with a track formed in sections, one of which is hinge connected to the transfer car and is movable with respect to the latter from an operative position in which it projects over one edge of the car, into a retracted position in which it provides clearance for transfer car movement.

5. The combination with a stationary track, of a transfer car provided with a track adapted to receive a car from or deliver it to said stationary track and formed in sections, one of which is movably mounted on the transfer car, said stationary track and movable track sections having co-operating cam surfaces for accurately centering said transfer car with respect to said stationary track.

6. The combination with a stationary track of a transfer car provided with a track adapted to receive a car from or deliver it to said stationary track and formed in sections, one of which is mounted on said car to move into and out of an advanced position, each of said tracks comprising rails with bevelled ends which overlap, and which have their overlapping surfaces cam-shaped to effect accurate alignment of the two tracks when said hinged section is moved into said advanced position.

7. The combination with a stationary track and vertically adjustable metallic supporting means therefor, of a transfer car provided with a track adapted to receive a car from or deliver it to said stationary track and formed in sections, one of which is mounted on said car to move from an advanced position in which it projects beyond the edge of the car and rests upon said supporting means into a retracted position in which it is clear of said stationary track and supporting means.

8. A transfer car provided with a track formed in sections, one of which is hinge connected to the transfer car to turn with respect to the latter through an angle of something more than 90° from an operative position in which it projects over one edge of the car into a retracted position in which it extends upwardly from the car and backwardly from said edge, said hinge member and car having co-operating parts for holding the hinge member in its retracted position.

9. A transfer car provided with a track over which a car may be moved onto and off the transfer car said track being formed in sections, one of which is rigidly secured and the other of which is hinge connected to the transfer car, said track sections comprising rails with the adjacent ends of the aligning rails of the two sections bevelled, and with the outer ends of the rails of the hinged section bevelled so that the tread portions of the two ends of each of the last mentioned rails may overlap the tread portions of the corresponding rail of the first mentioned section and the corresponding rail of a stationary track receiving a car from, or delivering it to the track on the transfer car.

Signed at Cleveland, in the county of Cuyahoga and State of Ohio, this 2nd day of February, A. D. 1924.

PAUL A. MEEHAN.